June 30, 1959 A. VIDAL ET AL 2,892,897
TELEPHONE CALL DEVICE
Filed July 19, 1954
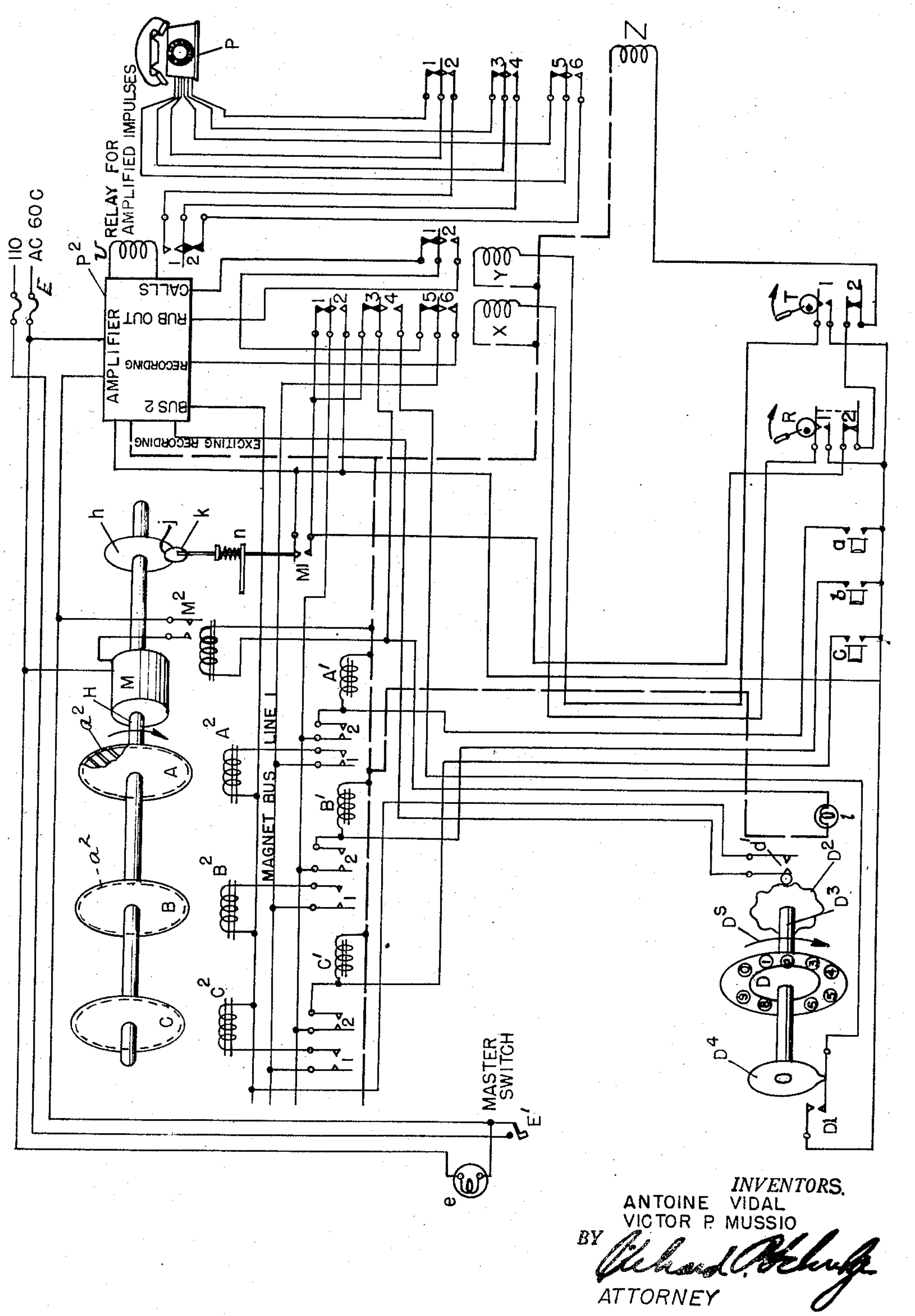
INVENTORS.
ANTOINE VIDAL
VICTOR P. MUSSIO
BY [signature]
ATTORNEY 2,892,897
Patented June 30, 1959

2,892,897

TELEPHONE CALL DEVICE

Antoine Vidal, Guaymas, and Victor P. Mussio, Mexico City, Mexico

Application July 19, 1954, Serial No. 444,324
10 Claims. (Cl. 179—90)

This invention relates to means for magnetically recording upon a movable carrier a group of magnetizations which complementally represent a telephone number to be called upon an automatic telephone, to the end that when said carrier is set in motion by the actuation of a single manually actuated element, such as by pressing a button, the necessary electrical impulses will be imposed upon the conventional telephone selector line to effect the placing of the telephone call, as previously recorded.

It is contemplated that the movable recording carriers will be multiplied in number to such reasonable extent that a user may have at hand and in a small box or casing the means for calling any one of a series of frequently called and previously recorded telephone numbers by the mere act of pressing a button corresponding to the number to be called. Thereafter the action of the apparatus is automatic in completing the desired call, without possibility of error and usually in less time than the call could be completed, by the operation of a conventional dial in the usual way.

Means are also provided whereby the recorded magnetizations imposed upon the movable carriers may be quickly removed or erased, to permit the substitution of other call numbers upon such carriers.

The elements employed, the method of operation, and the advantages of the invention will be best understood by reference to the diagrammatic outlay shown in the accompanying drawing.

The particular embodiment of the invention, chosen for purposes of explanation, comprises a plurality of rotative discs A, B and C constituting the carriers. These discs are mounted upon a shaft H that is driven by a motor M. The discs are made of any suitable dielectric material and they have embedded in their peripheral edges wires *a2*. Electromagnets A2, B2 and C2 disposed in juxtaposition to the peripheries of the discs serve to impose upon the wires *a2* magnetic recordings in the way now so commonly employed in wire recordings, the discs and wires and electromagnets complementally comprising magnetic recording and reproducing heads. The electromagnets A2, B2 and C2 are under the control of relays the windings of which are indicated at A', B' and C; and it may here be stated that throughout the drawings the windings of the several relays have been designated by letters and the contacts controlled by the windings have been designated by numerals. Thus, for example, relay X controls a group of contacts 1, 2, 3, 4, 5 and 6, the function of which will be hereinafter described. In effecting a recording of a frequently used number upon any one of the discs the user manually actuates a dial D corresponding to a conventional telephone dial. This dial is mounted upon a shaft D3 and this shaft carries a cam D4 the function of which cam is to break the circuit at D1 whenever D is in a position of rest and to close a circuit at such point during the time that the dial D is in operation. The purpose of this will be set forth in the description of the operation. The double direction arrows $D^5$, adjacent dial D, indicates that this dial is moved in one direction, or ahead by the user placing his finger in the selected opening of the dial and that it returns to its position of rest when released by the user, just as the usual telephone dial does. Shaft D3 carries an impulsion cam D2 which actuates the circuit making and breaking contacts *d'* to impose upon the electromagnets A2, B2 and C2 electrical values corresponding to the electrical values which would have been imposed upon the automatic selector lines associated with the conventional automatic telephone P upon a like movement of the dial P of the said telephone.

A suitable cabinet, not shown, may contain the motor, M, and associated parts, the carrier discs and a power pack casing P2. The apparatus may receive its power from a conventional 110 v. 60 c. circuit indicated at E. A master switch at E' controls the power supply and an electric light "*e*" is lighted when the power is on.

The power pack casing contains conventional apparatus for controlling the current values delivered to the apparatus from E, such for example, as amplifying and transforming means and it comprises outlets for receiving or delivering current for the purposes indicated by the indicia on the power pack which indicates that the respective leads or outlets there indicated supply exciting or energizing current to the recording electromagnets A2, B2 and C2 as well as current for effecting the erasure of recorded impulses on wires *a2* of the discs. An impulse relay U from the power pack connects the apparatus to the selector circuits of the automatic telephone line when delivering the component energizations set up by a previously recorded telephone number.

While it is not essential, it is contemplated that the recording dial D and its associated parts, a group of push buttons, one for each of the discs A, B and C, a recording key R and a rub out key T will be mounted in a small ornamental box, not shown, which will be placed close to the telephone P. Thus, the user may, if he wishes to do so, record a telephone number at the time it is given to him over telephone P.

The shaft H carries a disc *h* which has a notch *j* formed in its periphery. As long as motor M is at rest a roller *k* lies in notch *j* and a plunger *n* is ineffective to close contacts M'. When the motor starts the plunger is depressed to close said contacts and to maintain them closed until the shaft H has completed a revolution. Then the contact is broken at M' until the motor is again started.

From the foregoing it will be clear that the several operations carried out by the apparatus are:

(1) Recording magnetizations corresponding to a telephone number, such as a frequently called one, for future use.

(2) Delivering electrical impulses corresponding to the recorded number to an automatic telephone system automatically to effect a calling of said number; and (3) Erasing from a wire or like recorder, when desired, the magnetizations which complementally made up the recorded number.

Assuming that it is desired to register the number TE–76543 for future use, the procedure may be briefly stated as follows:

The key R is put in registering or recording position, that is, it is swung to the right as indicated by the arrow.

One of the buttons *a*, *b*, *c* (*a* for example) is pressed and the number is dialed on dial D.

Magnetizations corresponding to the called number will then be recorded on wire *a2* of disc A.

The key R is then restored to its position of rest, that is to say, it is moved to the position shown in the drawing.

The recording is effected as follows:

When R is closed, relay X closes and through its contacts X6 puts the bus line of electromagnets A2, B2 and C2 in connection with the recording or registering inlet of the amplifier. Pressing a button (*a* for example) energizes the coil of relay A′ which closes and remains closed by A2 and X2. A′1 connects magnet A2 to the electromagnet bus line.

When the first digit of the called number is dialed on dial D, D1 closes and starts the motor through X4. M1 closes as soon as the motor starts and the recording discs start to rotate at any convenient and selected speed. When the operator removes his finger to release dial D, said dial starts upon its reverse movement and sends through M2 and through the amplifier impulses corresponding to the dialed digits. These amplified impulses excite or energize electromagnet A2 through the circuit completed by X6 and A′1. This correspondingly magnetizes the wire *a*2 extending around disc A. When dial D comes to rest contact D1 opens and motor M stops.

Upon dialing for the second digit of the number being recorded D1 closes again, the motor M starts and the process is repeated successively for all the digits which constitute the number being registered.

When the last digit has been dialed, key R is returned to its position of rest, relay X comes to rest, that is, is deenergized and this in turn closes X1, X3 and X5. The motor starts again through M1, X3 and X5 and stops after completing a revolution, thus opening again, M1. Relay A′ which has been energized through M1, X1 and A′2 is deenergized and comes to rest when M1 opens and disconnects electromagnets A2. Whenever the motor is running a lamp 1 is lighted. The lighting of this lamp indicates that registering is taking place and that no other button should be pressed at this time.

Assuming that it is desired to call the number recorded upon disc B, button *b* is pressed until lamp 1 lights. Relay B′ closes and remains closed through B′2, X1 and M1, which latter closes as soon as the motor M starts turning. The motor starts through the completion of contacts at M1 and M2. The magnetizations previously created upon peripheral wire *a*2 of disc B excite electromagnet B2 and corresponding impulses are sent through B′1, X5 and Y1 to the amplifier. The amplified impulses are received at relay U and sent through U1, U2 and Z2, Z4 and Z6 to the automatic telephone selector line. The relay Z is energized when button *b* is pressed, through M1, R2 and T2. It remains energized as long as the motor turns and comes to rest when M1 opens. Its function is to disconnect the dial of phone P from the selector lines, and to connect instead the impulse relay U, when the apparatus is being used to call a recorded number. When the motor has completed its revolution and the recorded number has been called M1 opens and the motor comes to rest.

In erasing a recorded number, as for example the one on disc C, the key T is moved to closed position, that is, to the right in the drawing. T1 is thus closed. T2 is opened and consequently relay Z will not be energized during the erasing process. Relay Y is now energized, closing contacts Y2 and opening contacts Y1. This puts the magnet bus line in connection with the rubbing out or erasing outlet of the amplifier through X5 and Y2. Button C is now pressed until lamp 1 lights. Relay C1 is now energized, closing C′1 and C′2. Electromagnet C2 is now excited with erasing current from the amplifier through Y2, X5 and C′1. Motor M starts turning through C′2, X1 and X3 and continues as M1 closes. After the completion of one turn of motor shaft H, M1 opens and the motor and all relays come to rest.

It should be noted that the relay Z is excited only when the apparatus is sending a call. Normally, it is at rest and the standard phone dial is connected to the phone through Z1, Z3 and Z5. Thus the phone may be used in the ordinary way, and any number dialed on its dial.

When a button *a*, *b*, *c*, etc. is pressed to send a recorded call, the phone dial is disconnected as Z1, Z3 and Z5 open, and the impulse relay U is connected in place of the dial through Z2, Z4, Z6, but only during the time necessary for the device to send the electrical impulses corresponding to the desired call number of the party.

It should be noted also that a call number of two letters and five digits may correspond to 7 trains of 10 impulses each. All those impulses will be recorded on one turn only of the disc. The diameter and the angular speed of the discs will be chosen in order to have a net magnetic recording on the smallest diameter and slowest angular speed.

The recording dial may be a standard dial on which a cam fixed to the finger disc will be installed to operate the contact D1. This contact has been installed to give to the operator recording a number the time he wants to record it.

It is known that the frequency of the trains of impulses formed by a phone dial is very important and is determined by a small centrifugal friction governor installed in every standard dial. The frequency of the recorded impulses will be exactly the same as the frequency given by the recording dial which will be standard. It will always be right, notwithstanding the speed of the motor rotating the discs. This motor could be of the same type as used in electric clocks, synchronous with a reduction gear.

The motor has been described as a single revolution motor and by this is meant a motor which when set in operation brings about one complete revolution of a motor shaft H upon which discs A, B and C are mounted, and then automatically comes to rest.

The contact D1 will stop the motor between each impulse train. There will be in this way a small interval between two trains, and the call number will be dialed by the apparatus in a minimum time, probably faster than by hand as many operators lose time between dialing two following digits. Dialing errors will be impossible, and the efficiency of the phone installation increased.

It is to be noted also that a number can be recorded during the use of the phone. This could be very useful in case, for example, of a party phoning his number to the user of the described apparatus. The operator could register the call number of his party in the same time as said party would tell his number by phone.

Normally, all elements of the apparatus will be at rest when not performing a call, a recording, or a number rubbing out.

The relays A′, B′, C′, U, X, Y, Z may be powered with low voltage, 24 volts for instance, obtained with a small oxide rectifier, or from the power pack of the amplifier. They could be of the same type used by the telephone installations, of high impedance. While we have chosen to illustrate discs such as A, B and C as the carrier elements it is to be understood that the invention is not limited thereto. Any movable carrier such as a slide, for example which first receives a group of impulses which complementally constitute a recorded number and then by its movement delivers said impulses in the recorded order to effect a telephone call would come within the scope of the invention.

Therefore it is to be understood that the invention is not limited to the particular arrangement shown but that it includes within its purview whatever changes fairly fall within either the terms or the spirit of the appended claims.

We claim:

1. Means for effecting a telephone call which comprises, a plurality of magnetic recording and reproducing heads each of which includes a carrier of a nature to receive and retain magnetizations, an electromagnet disposed in juxtaposition to the carrier, a recording dial movable to a plurality of positions each position corresponding to the identity of a digit constituting a part of a telephone number, means under control of said dial for imposing upon the electromagnet energizing electrical impulses corresponding to the movement of the dial, a motor for moving the carrier past said electromagnet, electrical connections for the motor and a manually operable element included in said connections the actuation of which sets the motor in operation to move the carrier past the electromagnet thereby to impose upon the carrier a group of magnetizations corresponding with said electrical impulses set up by the movement of the dial.

2. In a device of the character described, a single revolution motor, a plurality of carrier discs actuated thereby, wires disposed about the peripheries of said discs of a nature to receive and record magnetizations, a group of electromagnets, one for each of said discs said electromagnets being disposed adjacent said wires, a recording dial constructed to be manually moved by the user in the manner of a conventional telephone dial to a plurality of positions corresponding to the order of the digits of a telephone number to be recorded, a plurality of manually operated circuit closing members, electrical circuits in which said members, the electromagnets and the motor are included, the actuation of a selected one of the manual circuit closing members setting the motor in operation to cause the carrier wire to move with relation to the electromagnet and to have recorded thereon the magnetizations set up by the energization of the electromagnets through the operation of the recording dial.

3. A structure as recited in claim 2 in combination with means for supplying erasing electric current to said electromagnets and simultaneously supplying current to the motor to effect an erasure of the recorded magnetizations upon the wires as the carrier is moved with relation to the electromagnets.

4. Apparatus of the character described comprising, electric motor means selectively operable to rotate a shaft through a single revolution, a plurality of dielectric discs mounted upon said shaft, wires adapted to be magnetized, mounted upon the peripheries of said discs, electromagnets disposed in juxtaposition to said wires, manually operative recording means constructed to initiate operation of said motor means and to impose upon said electromagnets electrical impulses corresponding in number and order to a telephone number to be called and thereby to impose like recording magnetizations upon said wires of said discs.

5. A structure as recited in claim 3 in combination with means for imposing erasing current upon the electromagnets to remove from the wires the recorded magnetizations.

6. Apparatus of the character described for use with a subscriber's telephone set comprising, a plurality of traveling carriers, elements upon the carriers adapted to be magnetized, electromagnets disposed in such juxtaposition to the carriers as to magnetize said elements, manually operated means for delivering electrical impulses to the electromagnets for magnetizing a selected one of said elements in such relation and order as to correspond with a telephone number to be called, electrical circuits in which said electromagnets are included in which circuits call impulses are set up when the magnetized elements of the carriers are traversed past the electromagnets, means for amplifying the call impulses, a conventional automatic telephone and its call selecting circuits, and manually operated means for selecting one of said elements and conducting the amplified call impulses therefrom to the call selecting circuits of said telephone.

7. A structure as recited in claim 6 in combination with means for disconnecting the telephone from its usual call selecting circuits when the said amplified recorded call impulses are being delivered to said call selecting circuits of the said conventional telephone.

8. A combined recording and reproducing mechanism for use with a subscriber's telephone set for first recording and then delivering recorded impulses which represent a recorded telephone number, said mechanism comprising, a plurality of movable carriers having elements upon them adapted to receive and retain magnetizing forces, electromagnets associated with said carriers which serve when themselves energized with groups of electric current impulses magnetically to record the same upon the said elements under movement of the carriers past the electromagnets, the same electromagnets serving to have electric impulses set up therein for delivery as the previously magnetized elements are moved past the electromagnets, an automatic telephone and its circuit means for selecting called connections, manually operated means for generating a train of impulses representing any desired telephone number, selective means operable to energize said electromagnets with said train of impulses and move said carriers to record said number on said elements and means for connecting the electromagnets to said circuit means for selecting connections in accordance with previously recorded impulses from the elements of the carriers, and selective means for moving said carriers and effectively interrupting all but one of the circuits of the last named means connecting said electromagnets to said circuit means for selecting connections only in accordance with recorded impulses on the selected element.

9. A structure as recited in claim 8 in combination with means for disconnecting the dial circuits of the telephone from the circuit selecting circuits during the delivery of the previously recorded impulses to said selecting circuits of the telephone.

10. In a structure of the character described, a plurality of rotatable discs having magnetizable peripheral recording portions, electric motor means operable for rotating said discs through one complete revolution, individual electromagnetic transducers disposed adjacent each of said discs in magnetic recording and reproducing relation to said portions, a manually operable recording dial for generating a train of electrical impulses corresponding to a telephone number, a conventional automatic telephone including call selecting circuits, a push-button switch for selectively connecting to each of said transducers, a two-position switch, a circuit completed for one position of said two-position switch for impressing said train of electrical impulses on one of said transducers selected by said push-button switches, and a circuit completed for the other position of said two-position switch for applying impulses generated by one of said transducers selected by said push-button switch to said call selecting circuits of said telephone, the generation of said train of electric impulses for said one position or the actuation of one of said push-button switches for said other position of said two-position switch initiating said motor means for one complete revolution of said discs.

References Cited in the file of this patent

UNITED STATES PATENTS

| | | |
|---|---|---|
| 2,086,110 | Allen | July 6, 1937 |
| 2,298,519 | Tillman | Oct. 13, 1942 |
| 2,558,187 | Marrison | June 26, 1951 |
| 2,567,812 | Hickman | Sept. 11, 1951 |
| 2,640,647 | Rand | June 2, 1953 |
| 2,723,311 | Malthaner | Nov. 8, 1955 |